United States Patent [19]

Meijer

[11] Patent Number: 5,456,075
[45] Date of Patent: Oct. 10, 1995

[54] BALING PRESS

[76] Inventor: Thomas H. D. Meijer, Stadsweg 123, 9792 RE Ten Post, Netherlands

[21] Appl. No.: 68,112

[22] Filed: May 25, 1993

[30] Foreign Application Priority Data

May 27, 1992 [NL] Netherlands .................. 9200941

[51] Int. Cl.6 ................... A01D 90/08; A01F 15/04
[52] U.S. Cl. ..................... 56/341; 56/344; 100/189
[58] Field of Search .................... 56/16.6, 341, 344; 100/142, 188 R, 189

[56] References Cited

U.S. PATENT DOCUMENTS

| 3,552,109 | 1/1971 | Murray et al. | |
|---|---|---|---|
| 4,569,282 | 2/1986 | Galant | 56/341 X |

FOREIGN PATENT DOCUMENTS

| 912179 | 8/1946 | France . | |
|---|---|---|---|
| 1101028 | 9/1955 | France | 100/189 |
| 828618 | 1/1952 | Germany | 100/149 |
| 1220660 | 7/1966 | Germany | 56/344 |
| 1236263 | 3/1967 | Germany | 56/344 |
| 1238262 | 4/1967 | Germany | 56/344 |
| 1278782 | 9/1968 | Germany | 56/344 |
| 1285241 | 12/1968 | Germany | 56/344 |
| 1457974 | 12/1968 | Germany | 56/344 |
| 1289348 | 2/1969 | Germany | 56/344 |
| 2720883 | 11/1977 | Germany | 100/189 |
| 3439035 | 4/1986 | Germany | 56/344 |
| 3809132 | 5/1989 | Germany . | |
| 1029883 | 7/1983 | U.S.S.R. | 56/344 |
| 2034244 | 6/1980 | United Kingdom . | |
| 1574605 | 9/1980 | United Kingdom . | |

*Primary Examiner*—Ramon S. Britts
*Assistant Examiner*—James A. Lisehora
*Attorney, Agent, or Firm*—Deveau, Colton & Marquis

[57] ABSTRACT

A baling press for forming bales of agricultural crop comprises an essentially horizontal longitudinal compression chamber with an intake aperture provided on its underside, a press slide which can be moved to and fro in the longitudinal direction in front of the intake aperture in the compression chamber, an intake duct which is connected to the intake aperture of the compression chamber, the section of the intake duct on the side of the compression chamber intake aperture sloping upwards, a pick-up device fitted in the vicinity of the take-up area of the intake duct and at least one intake element which projects into the intake duct through a side wall and can be moved in the longitudinal direction of the intake duct. At least one wall of the upwardly-sloping section of the intake duct in the working area of the intake element is provided with retaining means which project inwards from said wall and which are designed to prevent the crop collected by the intake element in the upwardly-sloping section of the intake duct from sliding back into the intake duct.

5 Claims, 6 Drawing Sheets

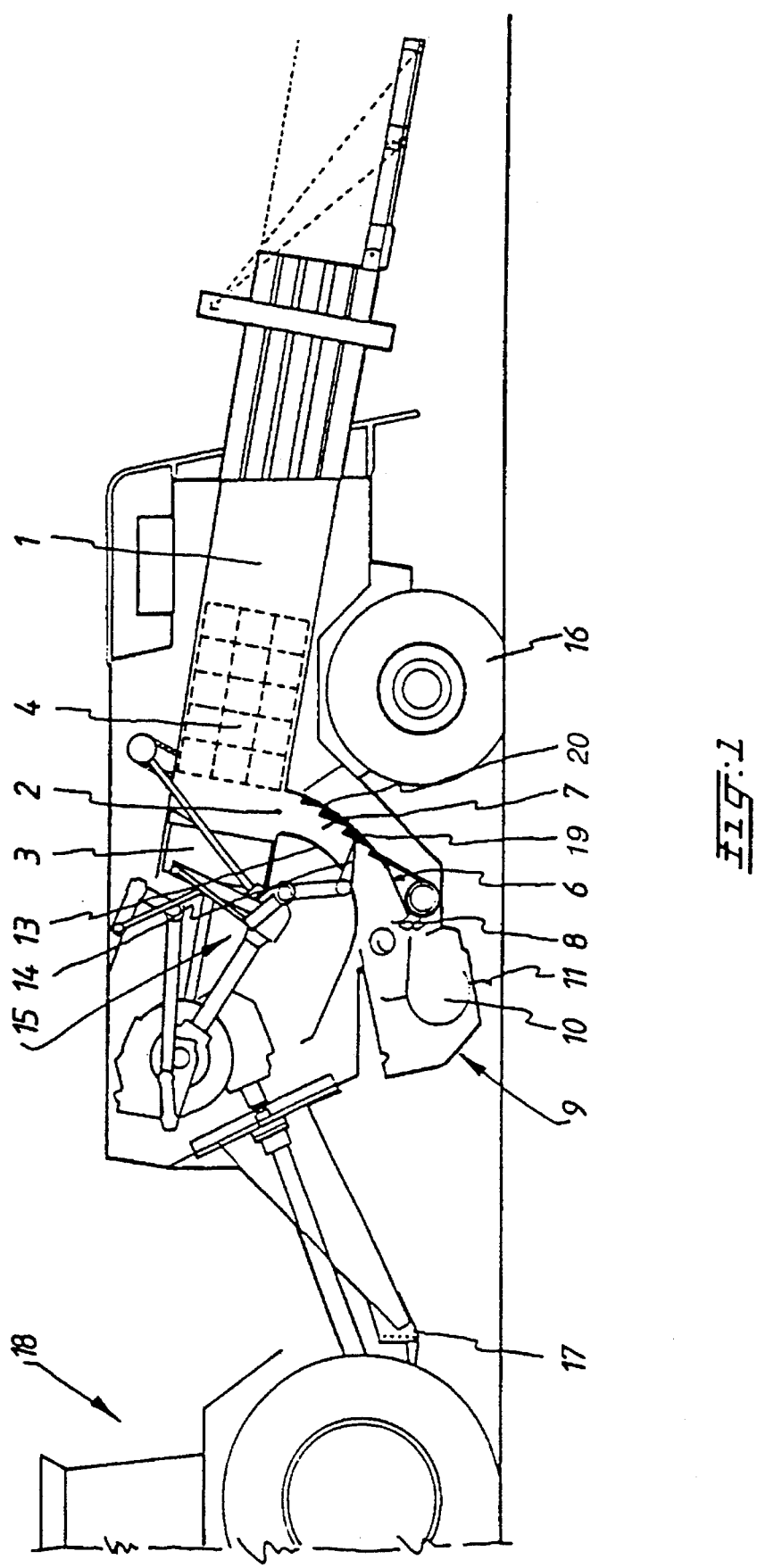

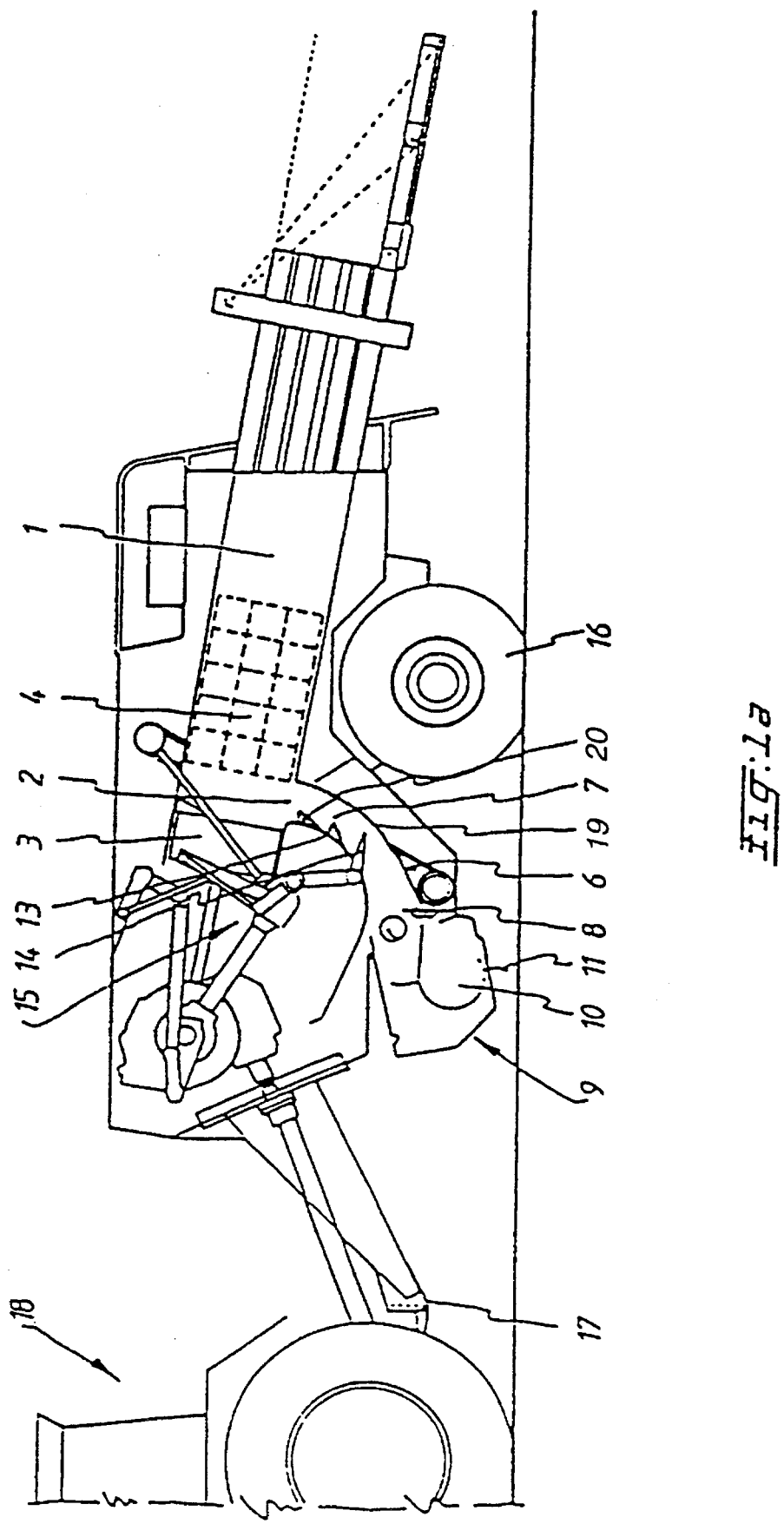

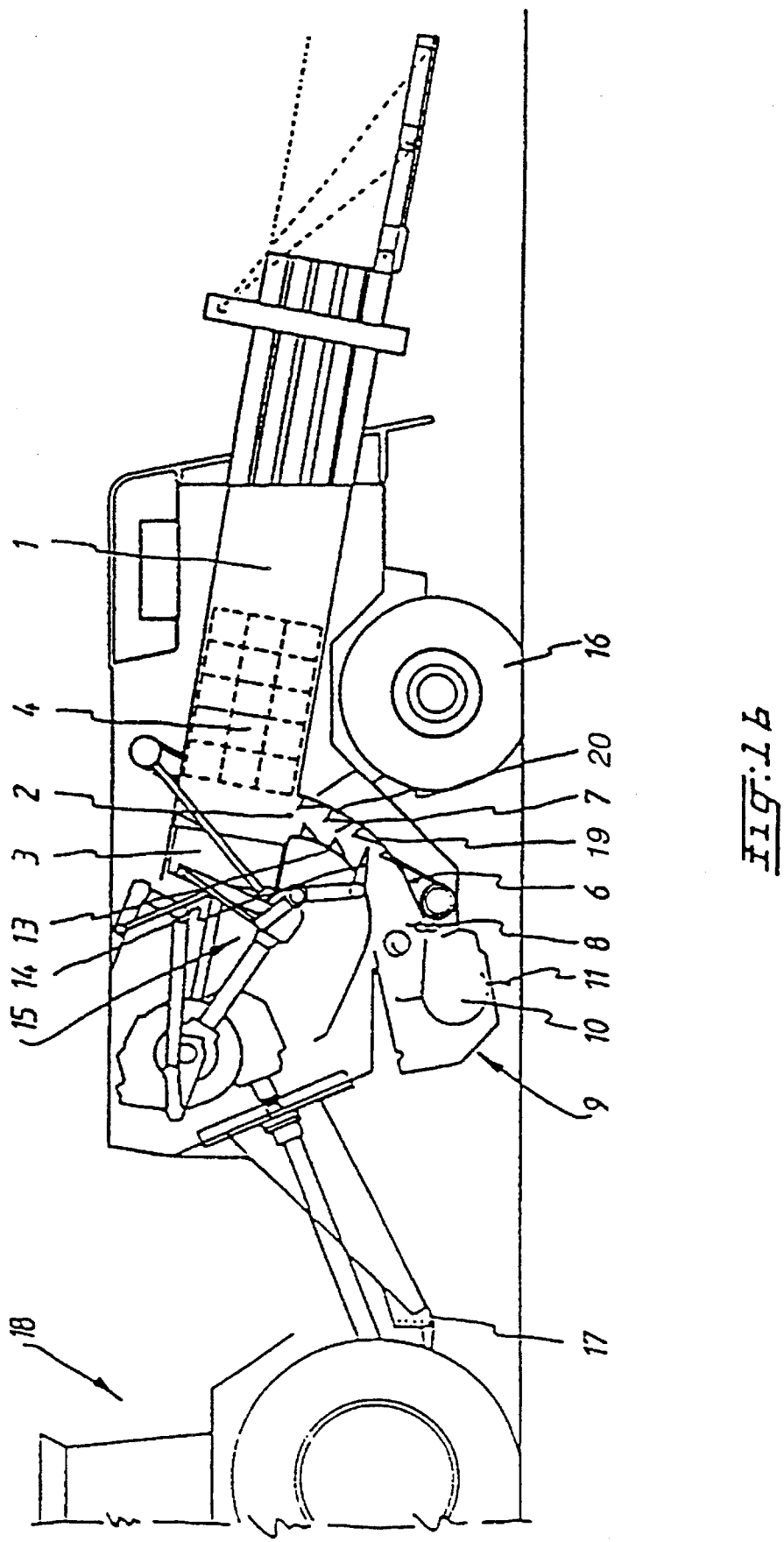

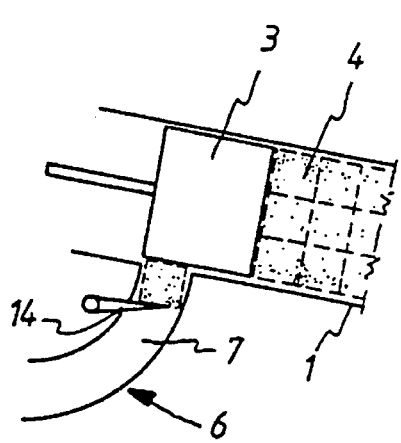
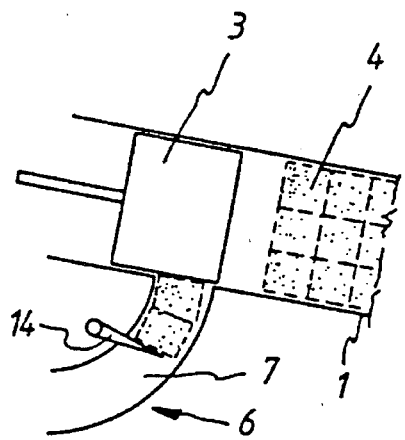
fig:2a   fig:2b
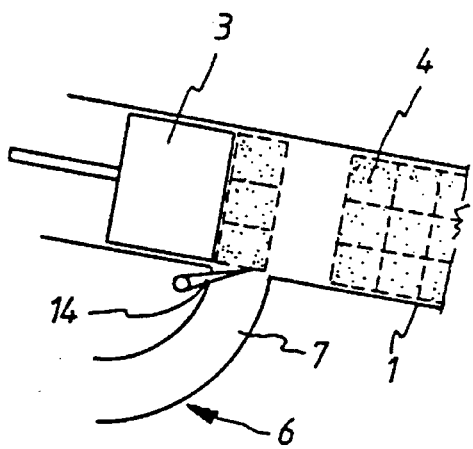
fig:2c
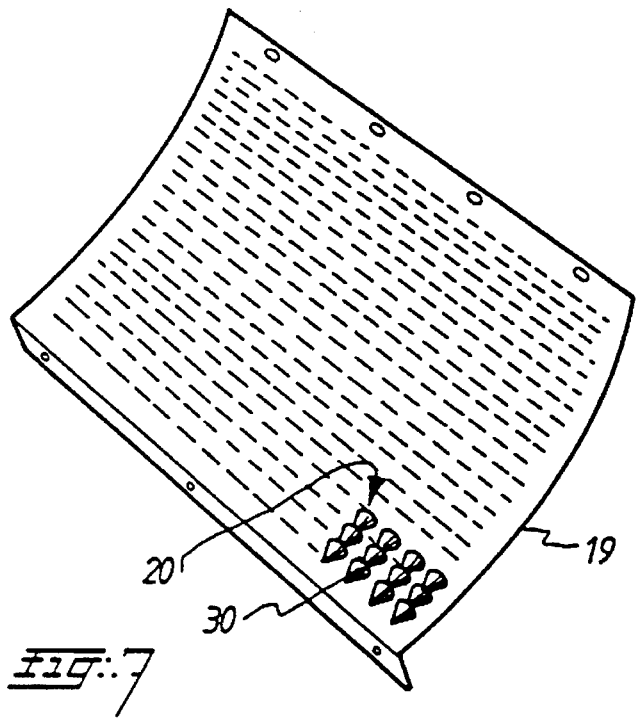
fig:7

BALING PRESS

BACKGROUND OF THE INVENTION

The invention relates to a baling press for forming bales of agricultural crop, comprising an essentially horizontal longitudinal compression chamber with an intake aperture provided on its underside, a press slide which can be moved to and fro in the longitudinal direction in front of the intake aperture in the compression chamber, an intake duct which is connected to the intake aperture of the compression chamber, the section of the intake duct on the side of the compression chamber intake aperture sloping upwards, a pick-up device fitted in the vicinity of the take-up area of the intake duct and at least one intake element which projects into the intake duct through a side wall and can be moved in the longitudinal direction of the intake duct.

Many embodiments of such a baling press are known in practice. In all embodiments, the crop lying on the land is taken up by means of the pick-up device and introduced continuously into the intake duct. The intake element which operates in the upwardly-sloping section of the intake duct, at regular intervals and in a number of steps, collects a certain amount of the crop present in the intake duct in the section of the intake duct which slopes upwards and is connected to the intake aperture of the compression chamber, and subsequently introduces this amount of crop into the compression chamber via the intake aperture. At the end of each collecting step, the intake element moves out of the intake duct. Consequently, for a short period of time, the crop collected in the upwardly-sloping section of the intake duct is not supported and as a result, it has a tendency to slide back into the intake duct. This is a major disadvantage with all known baling presses of the kind mentioned at the outset.

SUMMARY OF THE INVENTION

The object of the invention therefore is to provide a baling press which does not have said disadvantage.

This object is achieved in a baling press of the kind mentioned at the outset in that at least one wall of the upwardly-sloping section of the intake duct in the working area of the intake element is provided with retaining means which project inwards from said wall and which are designed to prevent the crop collected by the intake element in the upwardly-sloping section of the intake duct from sliding back.

By using the retaining means according to the invention, the compression chamber is filled more effectively and more evenly.

The retaining means may be mounted on the wall of the upwardly-sloping section of the intake duct, which wall is located opposite the intake element, or on the wall located on the side of the intake element of said section of the intake duct, or on both of said walls.

Expedient embodiments of the retaining means according to the invention are laid down in claims 5 to 9.

Because of their shape, the retaining means reduce the cross-sectional area of the intake duct only slightly, so that the resistance which the crop encounters when it is being conveyed through the intake duct is hardly affected.

The invention will be explained in greater detail by the following description of a number of preferred embodiments with reference to the drawings.

BRIEF DESCRIPTION OF THE DRAWINGS

FIG. 1 diagrammatically shows, in longitudinal section, a baling press according to the invention.

FIG. 1a diagramatically shows, in longitudinal section, an alternative embodiment of the invention of FIG. 1.

FIG. 1b diagramatically shows, in longitudinal section, another alternative embodiment of FIG. 1.

FIGS. 2a, 2b and 2c diagrammatically show the successive steps for the introduction of a certain amount of crop into the compression chamber of the baling press of the kind shown in FIG. 1.

FIG. 7 shows a fourth possible embodiment of the retaining means according to the invention.

DETAILED DESCRIPTION OF THE PREFERRED EMBODIMENTS

Figure 3:
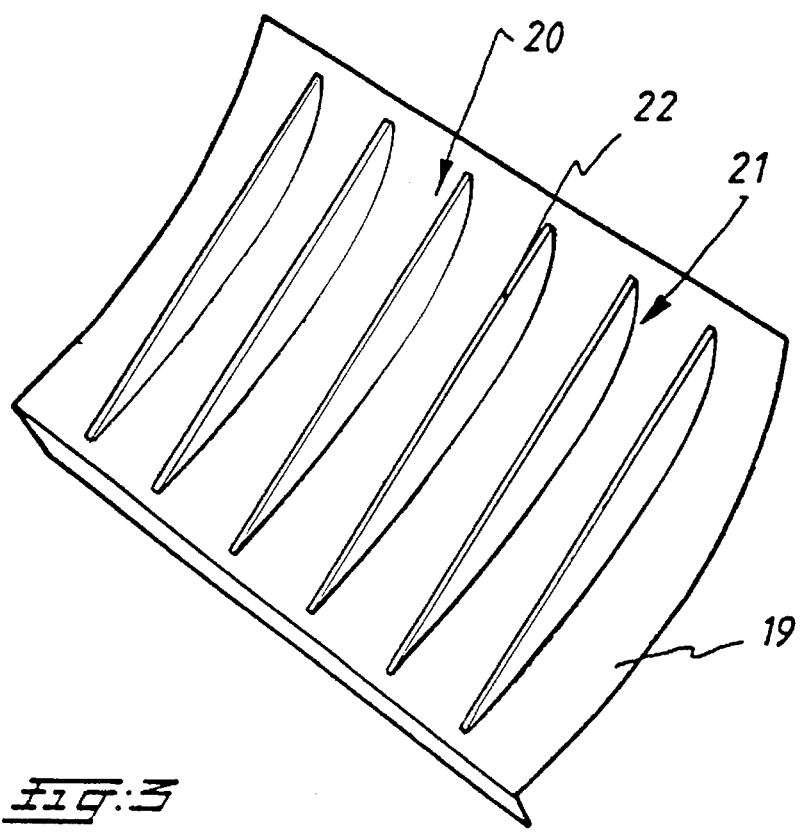
FIG. 3 shows a first possible embodiment of the retaining means according to the invention.

FIG. 1 diagrammatically shows a mobile baling press which is coupled to a tractor or the like. The illustrated baling press comprises an essentially horizontal, longitudinal compression chamber 1, which in this case has a slight backwards inclination. The compression chamber 1 is provided with an intake aperture 2 on its underside. Furthermore, a press slide 3 is provided which can be moved to and fro in the longitudinal direction in front of the intake aperture 2 in the compression chamber 1 for forming the crop, introduced into the compression chamber 1 via the intake aperture 2, into bales. Connected to the intake aperture 2 of the compression chamber 1 is an intake duct 6, whose section 7 on the side of the intake aperture 1 of the compression chamber 1 is curved upwards. The section 8 of the intake duct 6, which section 8 is connected to section 7, extends forwards to the front, towards the take-up area 9 of the intake duct 6. A pick-up device 10 is fitted in the take-up area 9 of the intake duct 6, which device usually consists of a drum which is provided with teeth 11 and rotates about a horizontal axis or a number of bars which rotate about a horizontal axis and are provided with teeth 11. By means of the pick-up device 10, crop lying on the land is taken up and introduced into the intake duct 6.

The baling press is furthermore provided with an intake element 14 which projects from one side through slots in the curved side wall 13 of the upwardly-sloping section 7 of the intake duct 6 and is displaceable in the longitudinal direction of the intake duct. Said intake element is driven by a linkage 15. The intake element 14 makes a movement which is such that a certain amount of the crop present in the intake duct 6 is collected at regular intervals and in a number of steps, for example three, in the upwardly-sloping section 7 of the intake duct 6. In this case, the intake aperture 2 of the compression chamber 1 is closed off by the press slide 3. At the end of the last collecting step, when the press slide 3 has again cleared the intake aperture 2, the intake element 14 introduces the amount of crop which has been collected in said manner into the compression chamber 1, via the intake aperture 2. There, said crop is compressed further by the press slide 3 in order to be formed into a bale 4, together with the crop which was previously introduced into the compression chamber 1. This entire process is shown diagrammatically in FIGS. 2a, 2b and 2c, where the three successive steps of collecting a certain amount of crop and introducing it into the compression chamber 1 by means of the intake element 14 are shown. During the successive steps, the intake element 14 projects into the intake duct. At the end of each step, the intake element 14 retracts from the intake duct and—outside the intake duct—moves back to its initial position for the next step. Of course, the movement of the intake element 14 and the movement of the press slide 3 are synchronised.

Furthermore, the baling press comprises a supporting frame which is provided with road wheels 16 and a shaft 17 by means of which the baling press can be coupled to a tractor 18.

The baling press described above is, in practice, known per se. The disadvantage of this known baling press and of other known baling presses of the kind mentioned at the outset is that, during the return movement of the intake element 14 between two collecting steps, when the intake element is located outside the intake duct, the crop which has been collected by means of the intake element 14 in the upwardly-sloping section 7 of the intake duct 6 has a tendency to slip back into the intake duct under the influence of gravity.

In order to overcome this drawback, at least one wall of the upwardly-sloping section 7 of the intake duct 6 in the working area of the intake element 14 is provided, according to the present invention, with retaining means which project inwards from said wall. Said retaining means prevent the crop collected by the intake element 14 in the upwardly-sloping section 7 of the intake duct 6 from sliding back into the intake duct 6. Use of these retaining means enables the compression chamber 1 to be filled more effectively and more evenly.

In the baling press illustrated in FIG. 1, the retaining means, which are denoted by reference numeral 20, are fitted on the wall 19 of the upwardly-sloping section 7 of the intake duct 6, which wall is located opposite the intake element 14.

However, it is also possible to fit retaining means on the wall 13 of the upwardly-sloping section 7 of the intake duct 6, which wall is located on the side of intake element 14 as shown in FIG. 1a. In some cases it may be advantageous to fit retaining means to both the wall 19 and the wall 13 as shown in FIG. 1b.

The retaining means 20 according to the invention may be designed in various ways. FIGS. 3 to 7 show four possible embodiments. Of course, further embodiments are also possible within the scope of the invention.

FIGS. 3 to 7 show a section of the wall 19 of the upwardly-sloping section 7 of the intake duct 6 with the retaining means 20 fitted thereon.

In the embodiment according to FIG. 3, the retaining means consist of a number of elongate, flat, raised strips 21 which extend in the longitudinal direction of the intake duct 6 and are spaced apart in the transverse direction of the intake duct. The free side edge 22 of each of the strips gradually runs towards the wall 19 of the intake duct 6 in the direction of the take-up area 9 of the intake duct 6. It is thereby ensured that the strips are not in the way when the crop which has been taken along by the intake element 14 is moved upwards. The strips 21 are shaped in such a way that they prevent the crop collected in the upwardly-sloping section 7 of the intake duct 6 from sliding back into the intake duct 6 during the return movement of the intake element 14, i.e. when the crop is only subjected to its own weight.

Figure 4:
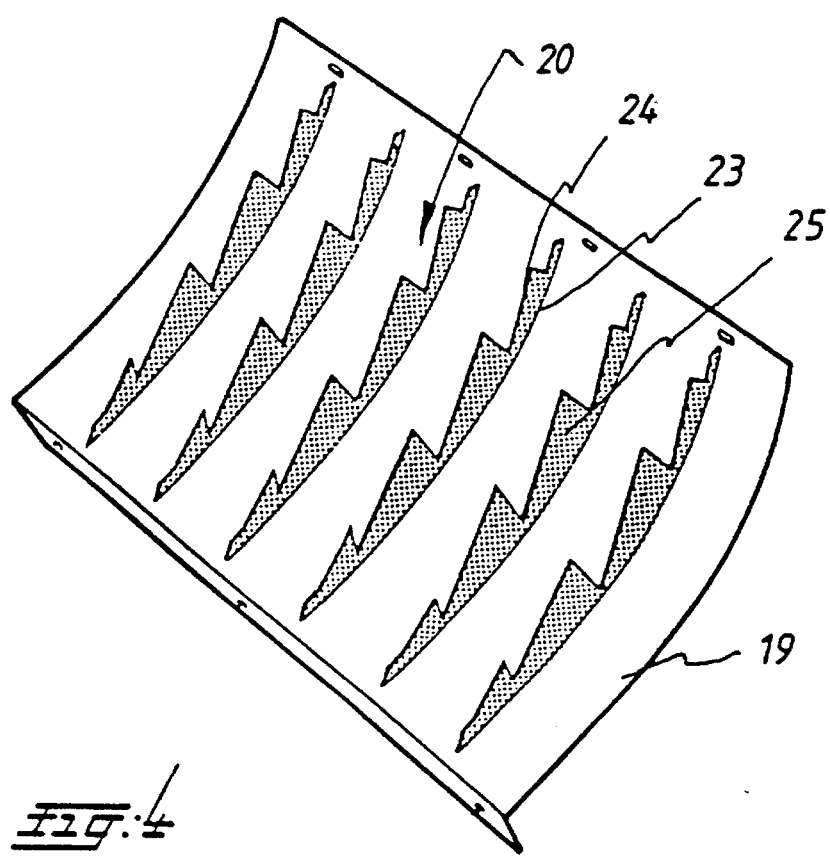
FIG. 4 shows a second possible embodiment of the retaining means according to the invention.

In the embodiment illustrated in FIG. 4, the retaining means consist of elongate strips 23, approximately resembling those of the embodiment of FIG. 3. However, in the embodiment according to FIG. 4, the free side edge 24 of the strips 23 is toothed. On the side facing the take-up area 9 of the intake duct 6, the teeth 25 have a relatively small slope and on the side facing the compression chamber 1, they are relatively steep. By using this kind of retaining means, the crop is prevented from sliding back into the intake duct in a very effective manner.

Figure 5:
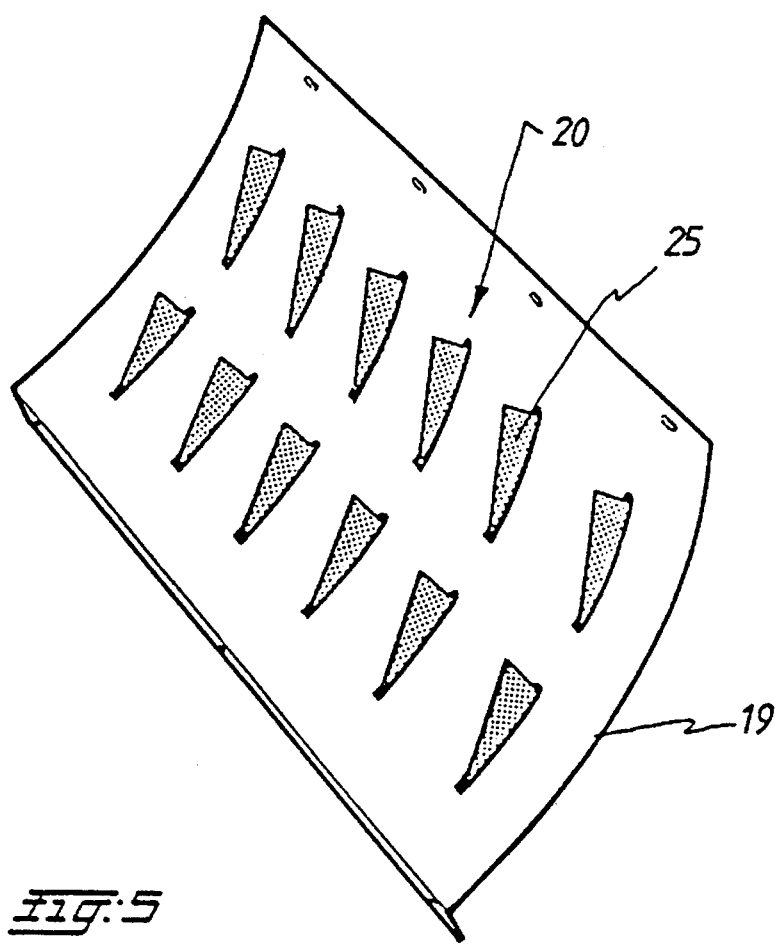
FIG. 5 shows a third possible embodiment of the retaining means according to the invention.

In the embodiment of FIG. 5, the retaining means 20 consist of a number of flat, raised separate teeth 25 which extend in the longitudinal direction of the intake duct 6 and are spaced apart in the transverse direction of the intake duct. On the side facing the take-up area 9 of the intake duct 6, the teeth 25 have a relatively small slope and on the side facing the compression chamber 1, they are relatively steep. Thus, the crop can be retained very effectively by the retaining means according to FIG. 5, as is the case with the retaining means according to FIG. 4.

Figure 6:
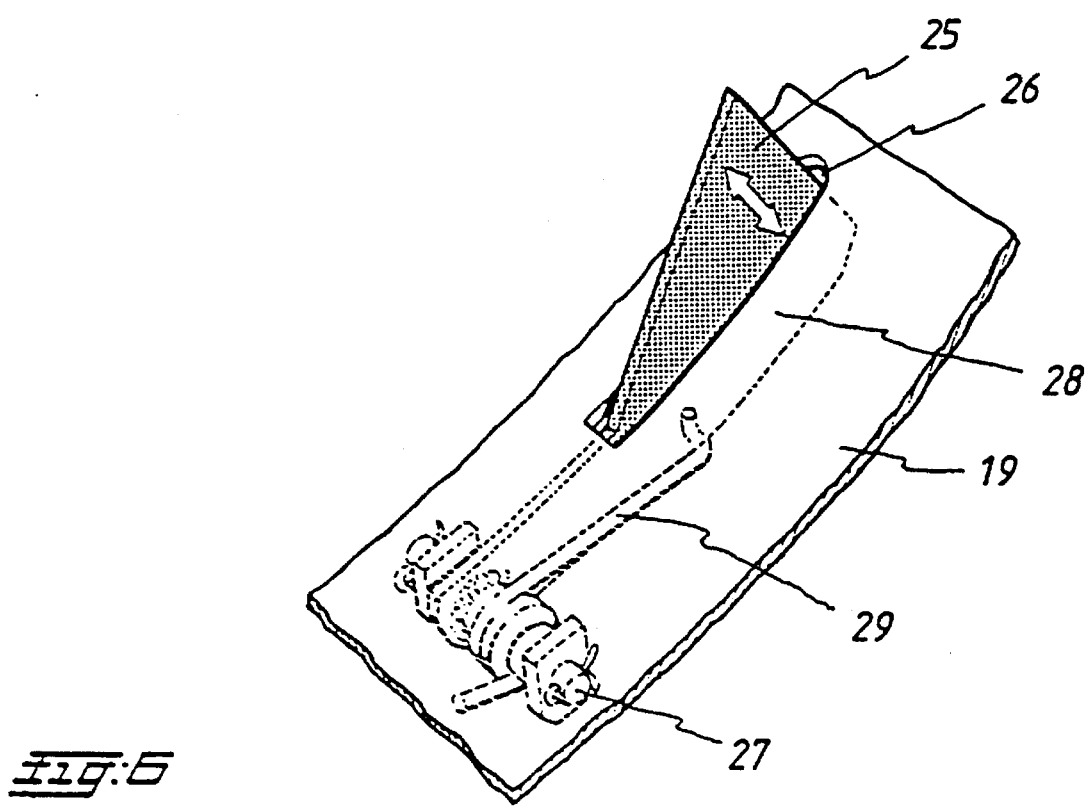
FIG. 6 shows a detail of FIG. 5.

The teeth 25 may be attached in a fixed manner to the wall 19 of the intake duct. However, it is also possible, as indicated in FIG. 6, to insert the teeth 25 from the outside through the slots 26 in the wall 19 of the intake duct 6 and for these teeth to be displaceable in a direction at right angles to said wall 19, the teeth being pressed into the intake duct 6 by means of spring force. In the embodiment according to FIG. 6, this is achieved in that each of the teeth 25 is fixed onto an arm 28 which rotates about an axis 27 and in that a spring 29 is made to act on said arm which ensures that the arm 28 is pressed against the wall 19. By designing the teeth 25 as spring-mounted teeth 25, the resistance which the crop encounters when it is being conveyed by the conveying element 14 is reduced to a minimum.

In the embodiment of FIG. 7, the retaining means consist of small embossed wall parts 30 which may, for example, be shaped in the form of a half cone and of which only a few have been shown in FIG. 7. The wall parts 30 have a relatively small slope on the side facing the take-up area 9 of the intake duct and are relatively steep on the side facing the compression chamber 1. The wall 19 thus has a shape resembling that of a grater. In the upwards direction, the crop slides easily over the wall 19, while in the opposite direction it is retained.

As mentioned, the retaining means can also be fitted on the wall 13 of the upwardly-sloping section 7 of the intake duct 6 or on both walls 19 and 13. However, the height of the retaining means will generally be less on the wall 13 than on the wall 19. An example of the use of the retaining means on both walls 13 and 19 can be found in the retaining means according to FIG. 5 or FIG. 7 having a small height on the wall 13, and retaining means according to FIG. 6 on the wall 19, in which case the spring-mounted teeth 25 can be positioned such that they grip exactly under an amount of crop lifted up by the intake element 14 after a collecting step.

Of course, other combinations of retaining means are possible.

It will be obvious that the use of the retaining means illustrated in FIGS. 3 to 7 reduces the cross-sectional area only very slightly. The conveyance of the crop in the direction of the compression chamber by means of the conveying element 14 will therefore not be affected, or will be affected only slightly. On the other hand, the shape of the retaining means is indeed such that the crop which has been collected in the upwardly-sloping section 7 of the intake duct 6 is prevented, in an effective manner, from sliding back into the intake duct when the crop is subjected only to its own weight.

By using the retaining means according to the invention, the action of the baling press has been substantially improved. The compression chamber is filled more quickly and efficiently and the distribution of the crop is more even, so that the compressed bales have a more uniform density.

What is claimed is

1. A baling press for forming bales of agricultural crop, comprising an essentially horizontal longitudinal compression chamber with an intake aperture provided beneath said compression chamber, a press slide which can be moved to and fro longitudinally across said intake aperture in said compression chamber, an intake duct which is connected to said intake aperture of said compression chamber, said intake duct having an upwardly-sloping section adjacent said intake aperture, a pick-up device fitted near said intake duct and at least one intake element which projects into said intake duct and can be moved longitudinally within said intake duct, said upwardly-sloping section of said intake duct having at least one wall having an inner surface inside said duct, an outer surface outside said duct and a plurality of slots extending through said at least one wall, said at least one wall being provided with retaining means which project through said slots and which are designed to prevent a crop collected by said intake element in said upwardly-sloping section of said intake duct from sliding back into said intake duct, said retaining means comprising a plurality of flat spring-biased arms each mounted on said outer surface of said at least one wall at a location spaced from one of said slots, each arm having a tooth thereon projecting through said one of said slots and displaceable in a direction transverse to said intake duct, each said tooth being urged into said intake duct by one of said spring-biased arms.

2. The baling press of claim 1, wherein said retaining means are mounted on said at least one wall said at least one wall being located opposite said intake element.

3. The baling press of claim 1, wherein said retaining means are mounted on said at least one wall, said at least one wall being located on the side of said intake element.

4. The baling press of claim 1, wherein said retaining means are mounted on both said at least one wall, said at least one wall being located opposite said intake element, and on a second wall of said upwardly-sloping section of said intake duct, said second wall being located on the side of the intake element.

5. The baling press of claim 1, wherein said teeth extend in the longitudinal direction of said intake duct and are spaced apart in the transverse direction of said intake duct, said teeth having a relatively small slope on their side facing said pick-up device, and being relatively steep on their side facing said compression chamber.

* * * * *